United States Patent
Wang et al.

(10) Patent No.: US 12,465,983 B2
(45) Date of Patent: Nov. 11, 2025

(54) RECIPROCATING TOOL

(71) Applicant: Hilti Aktiengesellschaft, Schaan (LI)

(72) Inventors: Angus Wang, Shanghai (CN); Mars Cai, Shanghai (CN); Günter Haas, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 246 days.

(21) Appl. No.: 18/256,842

(22) PCT Filed: Nov. 18, 2021

(86) PCT No.: PCT/EP2021/082057
§ 371 (c)(1),
(2) Date: Jun. 9, 2023

(87) PCT Pub. No.: WO2022/122330
PCT Pub. Date: Jun. 16, 2022

(65) Prior Publication Data
US 2024/0017336 A1   Jan. 18, 2024

(30) Foreign Application Priority Data

Dec. 11, 2020 (CN) .......................... 202011456519.2

(51) Int. Cl.
*B23D 49/10* (2006.01)
*B23D 49/16* (2006.01)

(52) U.S. Cl.
CPC ............ *B23D 49/105* (2013.01); *B23D 49/16* (2013.01)

(58) Field of Classification Search
CPC ...... B23D 49/16; B23D 49/00; B23D 49/105; B23D 51/00; B23D 51/02; B27B 9/02;
(Continued)

(56) References Cited

U.S. PATENT DOCUMENTS 5,007,172 A * 4/1991 Palm ................... B23D 51/02
30/392
5,421,091 A   6/1995 Gerritsen, Jr.
(Continued)

FOREIGN PATENT DOCUMENTS

| CN | 201535297 U | 7/2010 |
|----|-------------|--------|
| CN | 105665820 A | 6/2016 |

(Continued)

OTHER PUBLICATIONS

English language translation of CN 205551638 U to Zhejiang Yat Electric Appliance Co Ltd.*
(Continued)

*Primary Examiner* — Evan H Macfarlane
(74) *Attorney, Agent, or Firm* — Crowell & Moring LLP

(57) ABSTRACT

A reciprocating tool includes a reciprocation conversion mechanism disposed in a casing neck, a saw blade connected to the reciprocation conversion mechanism, a shoe, and a shoe adjustment mechanism. The shoe adjustment mechanism has a cover plate connected to the reciprocation conversion mechanism and a slide pin. The shoe has a support and a guide plate pivotably connected to the support. The guide plate is disposed between the cover plate and the reciprocation conversion mechanism. The guide plate has a slide groove parallel to a direction of reciprocation. The slide pin passes through the slide groove. In a locked position of the shoe adjustment mechanism the slide pin is engaged in the slide groove and the guide plate is locked by the slide pin. In an unlocked position the slide pin is disengaged from the slide groove and the guide plate is slidable in the direction of reciprocation.

6 Claims, 2 Drawing Sheets

(58) Field of Classification Search
CPC . B27B 21/08; Y10T 405/598; Y10T 405/604; F16B 7/10; F16B 7/14
USPC ..................................... 403/324, 328, 109.3
See application file for complete search history.

(56) References Cited

U.S. PATENT DOCUMENTS

| | | | | |
|---|---|---|---|---|
| 5,450,925 | A * | 9/1995 | Smith ................... | B23D 49/165 184/5 |
| 6,249,979 | B1 * | 6/2001 | Bednar ................ | B23D 49/165 30/182 |
| 6,272,757 | B1 * | 8/2001 | Roe ...................... | B23D 49/167 30/392 |
| 7,082,689 | B2 * | 8/2006 | Beville .................. | B23D 51/03 30/392 |
| 7,310,880 | B2 * | 12/2007 | Hartmann .............. | B23D 51/02 30/392 |
| 7,437,824 | B2 * | 10/2008 | Chreene ............... | B23D 49/167 403/324 |
| 7,963,043 | B2 * | 6/2011 | Chen .................... | B23D 49/167 30/392 |
| 7,971,362 | B2 * | 7/2011 | Haas ...................... | B23D 51/02 30/392 |
| 8,006,392 | B2 * | 8/2011 | Moreno ............... | B23D 49/167 30/392 |
| 8,220,165 | B2 * | 7/2012 | Gadams ............... | B23D 49/167 30/375 |
| 9,421,625 | B2 * | 8/2016 | Selby .................... | B23D 49/167 |
| 2004/0049928 | A1 * | 3/2004 | Phillips ................ | B23D 49/162 30/392 |
| 2005/0183271 | A1 * | 8/2005 | Sugiura .................. | B23D 51/02 30/392 |
| 2006/0090348 | A1 * | 5/2006 | Jiao ........................ | B23D 51/02 30/166.3 |
| 2007/0251104 | A1 * | 11/2007 | Heinrichs ............ | B23D 49/105 30/392 |
| 2014/0376990 | A1 * | 12/2014 | Lai .......................... | F16B 7/042 403/109.3 |
| 2015/0375315 | A1 * | 12/2015 | Ukai ...................... | B23D 51/00 30/392 |
| 2019/0240748 | A1 * | 8/2019 | Giltner .................. | B23D 49/11 |

FOREIGN PATENT DOCUMENTS

| | | |
|---|---|---|
| CN | 205551638 U | 9/2016 |
| CN | 208379580 U | 1/2019 |
| EP | 1 527 837 A1 | 5/2005 |
| JP | 2002-210612 A | 7/2002 |

OTHER PUBLICATIONS

PCT/EP2021/082057, International Search Report dated Feb. 25, 2022 (Three (3) pages).

* cited by examiner

RECIPROCATING TOOL

BACKGROUND AND SUMMARY OF THE INVENTION

The present invention relates to an electric tool, in particular to a reciprocating tool.

Reciprocating electric tools are well known in the art. The most well-known reciprocating tool is the reciprocating saw, wherein a cutting action is achieved through the reciprocation of a blade. The term "reciprocating saw" is generally used to refer to any power saw in which back and forth movement is used for cutting, e.g., a sabre saw, scroll saw or fret saw. Due to the reciprocating nature of the apparatus, these power saws are high-vibration apparatuses.

Many reciprocating tools, such as reciprocating saws, comprise a handle or gripping region on a main casing. The handle allows a user to position the saw in various orientations very easily; opposite the handle is a saw blade, and a front end of a saw blade clamping head has a "shoe". The user leans the shoe against a surface being cut, and applies a force to the surface in order to stabilize the high-vibration reciprocating saw. During cutting, the stability provided by the shoe allows the saw blade to form a cleaner cut.

The shoe of the reciprocating saw is generally adjustable relative to the blade. In these configurations, the shoe is generally designed to extend and retract in and out of a main body of the casing of the reciprocating saw, wherein a shoe adjustment apparatus slidably connected to the casing of the reciprocating saw allows the shoe to move towards or away from the saw casing. The adjustable shoe makes the distribution of wear on the saw blade more uniform.

When the shoe of the reciprocating saw is adjustable, it will be desired to hold the shoe securely on the main casing during cutting. When the shoe needs to change position, it will be necessary to push a spring into compression by pressing a button mounted on the casing, such that a meshing structure between the shoe and a cover plate disengages. However, an existing shoe adjustment mechanism has a very complex structure and a high failure rate; moreover, due to the complex structure thereof, if a fault occurs, it may even be necessary to replace an entire speed-reducing mechanism or housing.

Furthermore, additional gaps will form between components as the tool is used, and swarf produced by the reciprocating saw during cutting might accumulate in the gaps, with the result that the button of the shoe adjustment mechanism cannot operate normally. In addition, the button is mounted in a gripping region on the housing, the gripping region generally being rubber covering a metal gearbox; thus, a peripheral edge of the button might interfere with the rubber-covered gripping region in the course of long-term use. At this time, the operator will often use another tool to prise the button, and this might result in the button falling off the main housing.

The technical problem to be solved by the present invention is to provide a reciprocating tool having a structurally simple and reliable shoe adjustment structure, wherein a shoe is adjustably connected to the reciprocating tool, and gaps between components configured on the reciprocating tool can be minimized, reducing the possibility of components falling off a shoe adjustment mechanism.

To solve the abovementioned technical problem, the present invention employs the following solution.

A reciprocating tool, comprising a casing neck, a reciprocation conversion mechanism located in the casing neck, a saw blade that is connected to the reciprocation conversion mechanism and reciprocates, a shoe and a shoe adjustment mechanism, the shoe adjustment mechanism comprising a cover plate securely connected to the reciprocation conversion mechanism and a slide pin, the shoe comprising a support and a guide plate pivotably connected to the support, the shoe guide plate being disposed between the cover plate and the reciprocation conversion mechanism, the guide plate being provided with a slide groove substantially parallel to a direction of reciprocation, and the slide pin passing through the slide groove of the guide plate; the shoe adjustment mechanism has a locked position and an unlocked position; in the locked position, the slide pin is engaged in the slide groove of the guide plate, and the guide plate is locked by the slide pin; in the unlocked position, the slide pin is at least partially disengaged from the slide groove, and the guide plate can slide relatively in the direction of reciprocation.

According to a preferred embodiment of the present invention, the slide pin is substantially in the shape of a hollow cylinder, comprising a first portion having a first diameter and a second portion having a second diameter; the first portion and second portion substantially form a stepped shape, with the first diameter being smaller than the second diameter.

According to another preferred embodiment of the present invention, the shoe adjustment mechanism further comprises an insertion pin that is barbed at one end; an elastic component is provided between the insertion pin and the reciprocation conversion mechanism, and a barbed part of the insertion pin extends into the slide pin and engages with an upper edge of the first portion of the slide pin.

Preferably, the barbed part of the insertion pin consists of separate segments, distributed substantially uniformly at an upper end part of the insertion pin in a circumferential direction, and an opening is formed at the center of the insertion pin. A stop pin is inserted in the opening of the insertion pin. Another end of the insertion pin is provided with a button for a user to press.

According to another preferred embodiment of the present invention, the slide groove comprises at least one pair of arc-shaped slots, arranged substantially symmetrically at side edges of the slide groove; arc center angles corresponding to the arc-shaped slots are not greater than 180 degrees, and at least one pair of protrusions protruding into the slide groove are formed at edges of the arc-shaped slots or therebetween, with the minimum distance between the protrusions being between the first diameter and second diameter.

In the locked position, the second portion of the slide pin is located in the arc-shaped slots, and in the unlocked position, the elastic component is compressed, the slide pin slides towards the reciprocation conversion mechanism, such that the second portion of the slide pin disengages from the slide groove.

With the above technical solution employed in the present invention, the shoe can be adjusted in the direction of reciprocation conveniently and reliably through the locking and unlocking of a slide pin having first and second diameters relative to the slide groove of the shoe guide plate. When the second portion having the larger second diameter of the slide pin is engaged in the arc-shaped slide groove of the guide plate, the guide plate of the shoe and the slide pin are locked relative to each other, and cannot move relative to each other, at which time the position of the shoe relative to the blade is fixed; reliable locking is necessary for the reciprocating tool in a state of use. When it is necessary to adjust the position of the shoe relative to the blade, the operator hopes to be able to adjust the shoe conveniently and flexibly; according to the technical solution of the present invention, the operator need only press the button of the insertion pin, and the insertion pin compresses the elastic component, thereby driving the slide pin to move towards the reciprocation conversion mechanism, at which time the second portion having the larger second diameter of the slide pin disengages from the arc-shaped slots, and the first portion thereof having the smaller diameter enters a region of the arc-shaped slots. Furthermore, the minimum distance between the protrusions of the guide plate slide groove is greater than the first diameter, i.e., when the first portion of the slide pin is in the slide groove, the guide plate and slide pin are in an unlocked position relative to each other, and the guide plate can slide in the direction of reciprocation. Thus, the position of the shoe guide plate can be adjusted flexibly.

Moreover, since an upper end of the insertion pin is configured as a barbed part, preferably the barbed part consists of separate segments that are distributed substantially uniformly in the circumferential direction, and an opening is formed in the center. To ensure that the barbed part can pass through the first portion having the smaller diameter of the slide pin and engage with the upper edge of the first portion of the slide pin, the maximum outer diameter of the barbed part should be slightly larger than the first diameter, but must not be too large, otherwise assembly will be difficult. Furthermore, with an opening being formed in the center of the barbed part with separate segments, when the upper end of the insertion pin is inserted into the first portion having the smaller first diameter of the slide pin, the barbed part with the segments distributed uniformly in the circumferential direction will close towards the center slightly due to slight deformation of the material itself, such that at this time the maximum outer diameter of the barbed part is slightly smaller than the first diameter, and the barbed part can pass through the first portion of the slide pin. After passing through the first portion, the barbed part recovers its original shape, at which time the barbed part can engage with the upper edge of the first portion. With the elastic component being provided between the insertion pin and the reciprocation conversion mechanism, when the operator presses the insertion pin button, the insertion pin controls movement of the slide pin perpendicular to the direction of reciprocation of the saw blade in a simple and stable manner, thereby achieving switching between the locked position and unlocked position of the shoe.

Since the maximum outer diameter of the barbed part of the insertion pin is only slightly larger than the first diameter of the slide pin, there is a risk that the barbed part might deform and thus fall out of the slide pin during use. Thus, once the insertion pin has been fitted to the slide pin, a stop pin is inserted in the center opening thereof, to ensure that the segmented barbed part is no longer at risk of closing towards the center such that the maximum outer diameter thereof is smaller than the first diameter. This enables gaps between components configured on the reciprocating tool to be minimized, so that the problem of the insertion pin falling out of the slide pin will no longer arise.

The embodiments mentioned can be better understood through the following detailed description while perusing the accompanying drawings. It is emphasized that the various components are not necessarily drawn to scale. In fact, dimensions can be enlarged or reduced at will for the purposes of clear discussion. In the drawings, identical reference characters denote identical elements.

DETAILED DESCRIPTION OF THE DRAWINGS

Figure 1:
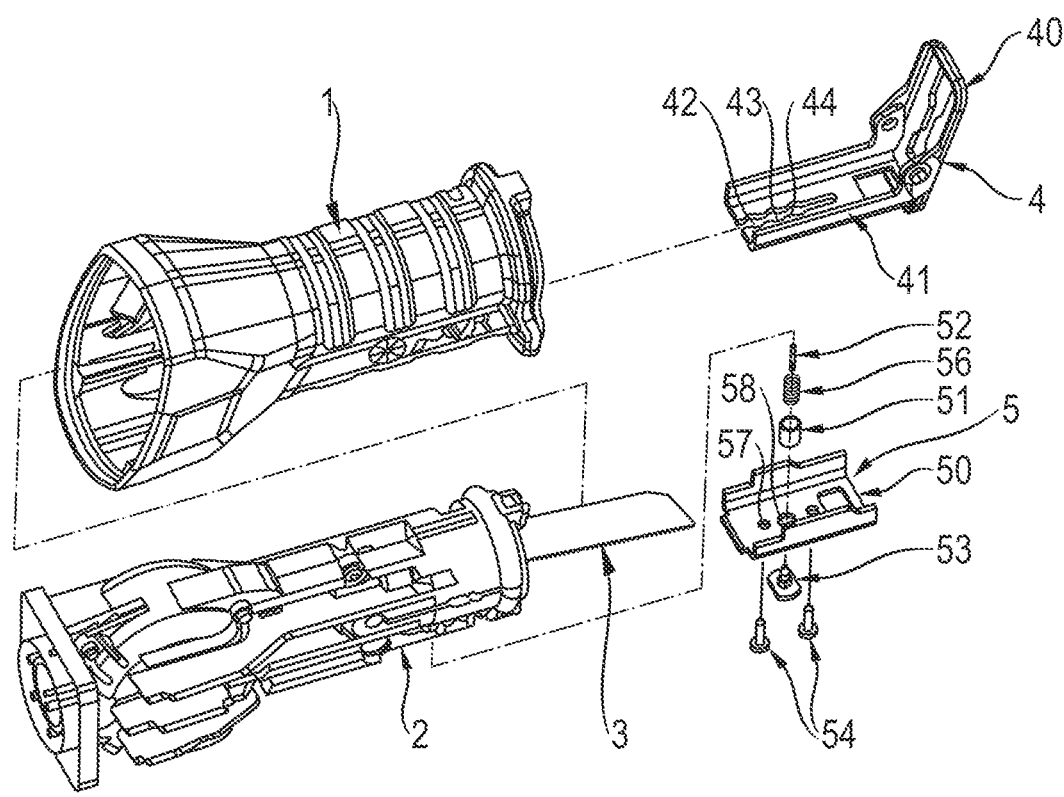
FIG. 1 is an exploded drawing of the reciprocating tool in a preferred embodiment of the present invention.

A reciprocating tool according to an embodiment of the present invention is described below with reference to FIGS. 1-3.

In a schematic embodiment of the present invention, the reciprocating tool is a reciprocating saw. In other embodiments, the reciprocating tool may be a device of another type that uses a reciprocating transmission mechanism, e.g., a jig saw, knife saw or impact drill, etc. FIG. 1 shows an exploded schematic drawing of a front end part of a reciprocating saw. As shown in FIGS. 1 and 2, the reciprocating saw of the present invention comprises a casing neck 1, and a reciprocation conversion mechanism 2 located in the casing neck 1. The reciprocation conversion mechanism 2 is configured to convert rotation of an electric machine or motor (not shown) to reciprocation in a straight line. According to a schematic embodiment of the present invention, the reciprocation conversion mechanism 2 comprises a gearbox, which is accommodated in the casing neck and has a housing structure adapted to the casing neck. The reciprocating saw further comprises a saw blade 3, which is connected to the reciprocation conversion mechanism 2 and reciprocates. Under the driving action of the electric machine or motor (not shown), the saw blade 3 reciprocates back and forth so as to cut a workpiece, and protrudes outside the casing neck 1. The back and forth motion of the saw blade 3 defines a tool axis for operation of the reciprocating saw. The tool axis is shown as an axis 20 in FIG. 2.

A shoe 4 is connected in front of the reciprocation conversion mechanism 2. The shoe 4 has a support 40, and a guide plate 41 pivotably connected to the support. In an embodiment disclosed in the present invention, the support 40 is pivotably connected to the guide plate 41. In other embodiments, the support 40 may be integrally formed with the guide plate 41, or be fixed relative to the guide plate. The support 40 is designed to be able to lean against a surface of a material being worked; the saw blade 3 passes through the support 40 of the shoe, such that a user can use the part of the saw blade 3 that extends through the support 40 to cut the material being worked. As will be appreciated, the shoe 4 may employ multiple configurations different from that shown in the disclosed embodiment.

The shoe 4 is connected to the reciprocation conversion mechanism 2 by means of a shoe adjustment mechanism 5. The shoe adjustment mechanism 5 comprises a cover plate 50; the cover plate 50 has a substantially U-shaped cross section, i.e., has a bottom face extending parallel to the direction of reciprocation, and two side edges extending upwards perpendicular to the bottom face. At least one mounting hole 57 is provided in the bottom face of the cover plate 50, and a screw 54 passes through the mounting hole to fix the cover plate to the reciprocation conversion mechanism 2; specifically, the screw 54 is securely connected in a threaded hole that is preset in the gearbox housing. A through-hole 58 is also provided in the bottom face of the cover plate. Preferably, there are two mounting holes 57, arranged at two sides of the through-hole 58 symmetrically in a direction parallel to the reciprocation.

The shoe adjustment mechanism 5 further comprises a slide pin 51, an insertion pin 53 and an elastic component 56. Referring to FIG. 3, the slide pin 51 is substantially in the shape of a hollow cylinder, comprising a first portion 511 having a first diameter and a second portion 512 having a second diameter; the first portion 511 and second portion 512 substantially form a stepped shape, with the first diameter being smaller than the second diameter.

Figure 2:
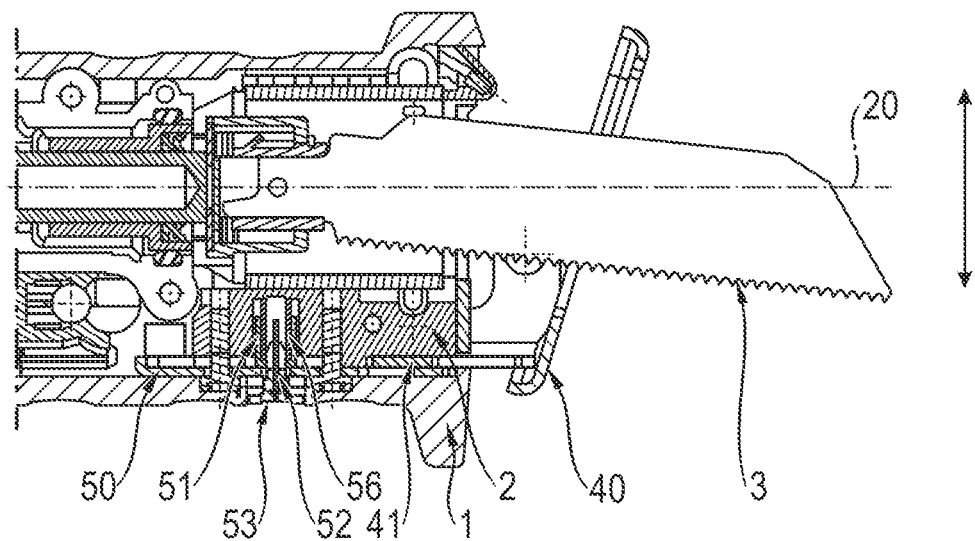
FIG. 2 is partial sectional view of the reciprocating tool according to a preferred embodiment of the present invention as shown in FIG. 1.
Figure 3:
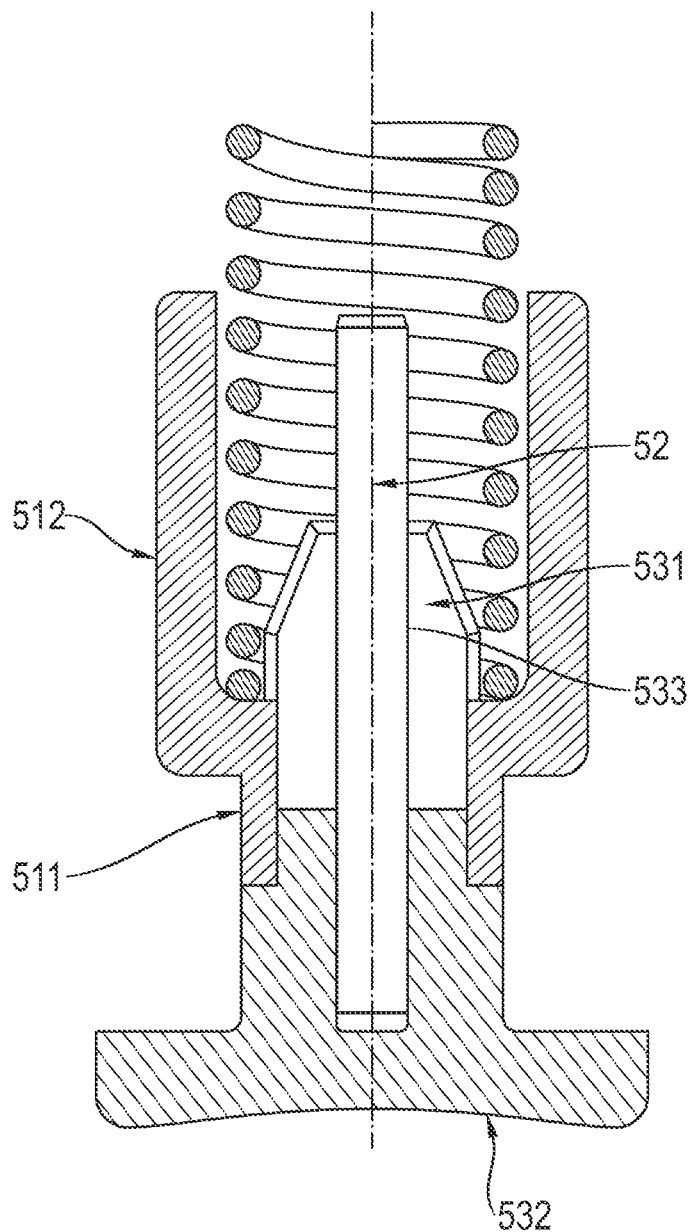
FIG. 3 is a partial schematic drawing showing the insertion pin and slide pin according to a preferred embodiment of the present invention.

As shown in FIGS. 2 and 3, an upper end of the insertion pin 53 is provided with a barbed part 531; the barbed part 531 of the insertion pin can extend into the slide pin 51, and the barbed part 531 engages with an upper edge of the first portion 511 of the slide pin. To ensure that the barbed part 531 can pass through the first portion 511 having the smaller diameter of the slide pin and engage with the upper edge of the first portion 511 of the slide pin, the maximum outer diameter of the barbed part 531 should be slightly larger than the first diameter, but must not be too large, otherwise assembly will be difficult.

Preferably, the barbed part 531 consists of separate segments, distributed substantially uniformly on the upper end of the insertion pin in a circumferential direction; the separate segments may be 2-8 in number, and preferably, there are 4 segments. An opening 533 is formed in the center of the barbed part consisting of separate segments. When the upper end of the insertion pin is inserted into the first portion 511 having the smaller first diameter of the slide pin, the barbed part 531 with the segments distributed uniformly in the circumferential direction will close towards the center slightly due to slight deformation of the material itself, such that at this time the maximum outer diameter of the barbed part 531 is slightly smaller than the first diameter, and the barbed part 531 can pass through the first portion 511 of the slide pin. After passing through the first portion, the barbed part recovers its original shape, at which time the barbed part 531 can engage with the upper edge of the first portion 511 of the slide pin, and be accommodated in the second portion 512 having the second diameter.

More preferably, a stop pin 52 is inserted in the opening 533. Since the maximum outer diameter of the barbed part 531 of the insertion pin is only slightly larger than the first diameter of the slide pin, there is a risk that the barbed part 531 might deform and thus fall out of the slide pin 51 during use. Thus, once the insertion pin 53 has been mounted to the slide pin 51, a stop pin 52 is inserted in the center opening thereof, to ensure that the segmented barbed part 531 is no longer at risk of closing towards the center such that the maximum outer diameter thereof is smaller than the first diameter. This enables gaps between components configured on the reciprocating tool to be minimized, so that the problem of the insertion pin falling out of the slide pin will no longer arise. The stop pin 52 may be a cylindrical pin, or a prismatic pin with a flat face, and could also be of a shape matched to the shape of the opening of the segmented barbed part. For example, when the barbed part consists of four separate segments, the opening formed thereby is substantially cross-shaped; thus, the cross section of the stop pin may also be configured to be substantially cross-shaped. Moreover, the material of the stop pin may be selected from any suitable material, e.g., metal, or plastic, or an elastic material (such as rubber), etc.

Another end of the insertion pin 53 is provided with a button 532 for the user to press. The button 532 may be substantially in the form of a flat plate; a periphery of the button is surrounded by a rubber layer of a gripping region of the casing neck 1 but can move perpendicular to the axis of reciprocation relative to the casing neck 1, i.e., in the up-down direction shown in FIG. 2.

The insertion pin 53 passes through the through-hole 58 in the cover plate 50; moreover, the barbed part 531 at the upper end thereof extends into the slide pin 51, and the barbed part 531 engages with the upper edge of the first portion 511 of the slide pin. The elastic component 56 is disposed between the insertion pin and the reciprocation conversion mechanism; preferably, one end of the elastic component 56 is accommodated in the second portion 512 of the slide pin, and another end thereof is accommodated in an opening that is preset in the gearbox housing.

The shoe guide plate 41 is disposed between the cover plate 50 and the reciprocation conversion mechanism 2, and the guide plate is provided with a slide groove 42 that is substantially parallel to the direction of reciprocation. The slide groove 42 comprises at least one pair of arc-shaped slots 43, arranged substantially symmetrically at side edges of the slide groove; arc center angles corresponding to the arc-shaped slots 43 are not greater than 180 degrees, and at least one pair of protrusions 44 protruding into the slide groove are formed at edges of the arc-shaped slots or therebetween, with the minimum distance between the protrusions 44 being between the first diameter and second diameter.

The shoe adjustment mechanism 5 has a locked position and an unlocked position; in the locked position, the slide pin 51 is engaged in the slide groove 42 of the guide plate, and in the unlocked position, the second portion 512 of the slide pin is disengaged from the slide groove 42, at which time the first portion 511 having the first diameter of the slide pin is located in the arc-shaped slots 43. The shoe can be adjusted in the direction of reciprocation conveniently and reliably through the locking and unlocking of the slide pin having the first and second diameters relative to the slide groove of the shoe guide plate.

In the locked position, the second portion 512 of the slide pin 51 is located in one pair of the arc-shaped slots 43; since the distance between the at least one pair of protrusions 44 protruding into the slide groove that are formed at edges of the arc-shaped slots 43 or therebetween is less than the second diameter of the slide pin 51, the slide pin 51 cannot pass the protrusions 44, i.e., the protrusions 44 block the slide pin 51 in an opening formed by one pair of arc-shaped slots 43. At this time, the guide plate 41 of the shoe and the slide pin 51 are locked relative to each other, and cannot move relative to each other, so the position of the shoe relative to the blade is fixed.

When it is necessary to adjust the position of the shoe guide plate, the shoe adjustment mechanism 5 is in the unlocked position. At this time, the operator presses the button 532 of the insertion pin 53 located at an outer shell of the casing neck 1. As shown in FIG. 2, when the operator presses the insertion pin button 532, the elastic component 56 is compressed, and the insertion pin and slide pin together move towards the gearbox housing, i.e., move upwards as shown in FIG. 2. At this time, the second portion 512 having the larger second diameter of the slide pin gradually disengages from the pair of arc-shaped slots, and the first portion 511 having the smaller diameter enters a region formed by the pair of arc-shaped slots. Since the distance between the two opposite protrusions 44 is larger than the first diameter, the first portion 511 of the slide pin can pass between the two protrusions 44. That is to say, at this time, the first portion 511 of the slide pin can move freely over the entire length of the slide groove along the axis 20. In reality, the position of the slide pin is fixed in the direction of the axis 20 of reciprocation; it is the guide plate 41 of the shoe that moves relatively. Thus, the guide plate 41 is in an unlocked position relative to the cover plate 50 and the gearbox housing, and the position thereof can be adjusted.

Once the shoe guide plate 41 has been adjusted to the desired suitable position, the button 532 is released, and under the action of the elastic component 56, the slide pin is pushed away from the reciprocation conversion mechanism 2, and the second portion 512 of the slide pin 51 again falls into a pair of arc-shaped slots. The fact that the arc center angles corresponding to the arc-shaped slots are not greater than 180 degrees ensures that the opening formed by the arc-shaped slots can restrict the second portion of the slide pin in the arc-shaped slots, so as to guarantee reliable locking of the shoe adjustment mechanism in the locked position.

Thus, the shoe adjustment mechanism of the present invention controls movement of the slide pin perpendicular to the blade movement direction by means of the barbed insertion pin in a simple and stable manner, thereby achieving switching between the locked position and unlocked position of the shoe; moreover, gaps in the shoe adjustment mechanism are minimized, thereby effectively avoiding dust accumulation that might occur during use as well as component detachment due to erroneous operation.

As stated above, although demonstrative embodiments of the present invention have already been explained herein with reference to the accompanying drawings, the present invention is not limited to the particular embodiments described above; many other embodiments are possible, and the scope of the present invention should be defined by the claims and their equivalent meaning.

The invention claimed is:

1. A reciprocating tool, comprising:
   a casing neck;
   a reciprocation conversion mechanism disposed in the casing neck;
   a saw blade that is connected to the reciprocation conversion mechanism and reciprocates;
   a shoe; and
   a shoe adjustment mechanism;
   wherein the shoe adjustment mechanism comprises a cover plate and a slide pin, wherein the cover plate is connected to the reciprocation conversion mechanism;
   wherein the shoe comprises a support and a guide plate pivotably connected to the support;
   wherein the guide plate is disposed between the cover plate and the reciprocation conversion mechanism, wherein the guide plate has a slide groove substantially parallel to a direction of reciprocation, and wherein the slide pin passes through the slide groove of the guide plate;
   wherein the shoe adjustment mechanism has a locked position and an unlocked position, wherein in the locked position the slide pin is engaged in the slide groove of the guide plate and the guide plate is locked by the slide pin, and wherein in the unlocked position the slide pin is at least partially disengaged from the slide groove and the guide plate is slidable in the direction of reciprocation;
   wherein the slide pin is substantially in a shape of a hollow cylinder that comprises a first portion having a first diameter and a second portion having a second diameter and wherein the first portion and the second portion substantially form a stepped shape with the first diameter being smaller than the second diameter;
   wherein the shoe adjustment mechanism further comprises an insertion pin that is barbed at a first end, wherein a barbed part of the insertion pin extends into the slide pin and the barbed part engages with an upper edge of the first portion of the slide pin, and wherein an elastic component is disposed between the insertion pin and the reciprocation conversion mechanism.

2. The reciprocating tool according to claim 1, wherein the barbed part of the insertion pin consists of separate segments distributed substantially uniformly at an upper end part of the insertion pin in a circumferential direction and wherein an opening is defined at a center of the insertion pin.

3. The reciprocating tool according to claim 2, wherein a stop pin is disposed in the opening of the insertion pin.

4. The reciprocating tool according to claim 3, wherein a second end of the insertion pin has a button that is pressable by a user.

5. The reciprocating tool according to claim 1, wherein the slide groove comprises at least one pair of arc-shaped slots disposed substantially symmetrically at side edges of the slide groove, wherein arc center angles corresponding to the arc-shaped slots are not greater than 180 degrees, wherein at least one pair of protrusions protruding into the slide groove are formed at edges of the arc-shaped slots or between the arc-shaped slots, and wherein a minimum distance between the protrusions being between the first diameter and the second diameter.

6. The reciprocating tool according to claim 5, wherein in the locked position the second portion of the slide pin is disposed in the arc-shaped slots and wherein in the unlocked position the elastic component is compressed and the slide pin slides towards the reciprocation conversion mechanism such that the second portion of the slide pin disengages from the slide groove.

* * * * *